(12) United States Patent
Lemarchand et al.

(10) Patent No.: US 11,268,450 B2
(45) Date of Patent: Mar. 8, 2022

(54) TURBOMACHINE WITH FAN ROTOR AND REDUCTION GEARBOX DRIVING A LOW-PRESSURE DECOMPRESSOR SHAFT

(71) Applicant: SAFRAN AIRCRAFT ENGINES, Paris (FR)

(72) Inventors: Kevin Morgane Lemarchand, Moissy-Cramayel (FR); Gilles Alain Marie Charier, Moissy-Cramayel (FR); Nathalie Nowakowski, Moissy-Cramayel (FR); Nicolas Jérôme Jean Tantot, Moissy-Cramayel (FR); Matthieu Pierre Michel Dubosc, Moissy-Cramayel (FR); Dominique Gerhardt Mayhew, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 148 days.

(21) Appl. No.: 16/610,095

(22) PCT Filed: May 2, 2018

(86) PCT No.: PCT/FR2018/000107
§ 371 (c)(1),
(2) Date: Nov. 1, 2019

(87) PCT Pub. No.: WO2018/202962
PCT Pub. Date: Nov. 8, 2018

(65) Prior Publication Data
US 2020/0080496 A1    Mar. 12, 2020

(30) Foreign Application Priority Data
May 2, 2017 (FR) ...................................... 1753856

(51) Int. Cl.
*F02C 7/36* (2006.01)
*F02K 3/06* (2006.01)
(Continued)

(52) U.S. Cl.
CPC ................... *F02C 7/36* (2013.01); *F01D 7/00* (2013.01); *F02K 3/06* (2013.01); *F01D 11/08* (2013.01);
(Continued)

(58) Field of Classification Search
CPC ........................................................ F02C 7/36
See application file for complete search history.

(56) References Cited

U.S. PATENT DOCUMENTS

| 5,281,094 A | * | 1/1994 | McCarty | H02K 7/14 |
| | | | | 416/147 |
| 9,708,914 B2 | * | 7/2017 | Fulayter | F04D 29/563 |

(Continued)

FOREIGN PATENT DOCUMENTS

| FR | 3080886 B1 * | 10/2020 | ........... F04D 29/526 |
| WO | 2014/143248 A1 | 9/2014 | |
| WO | 2015/012923 A2 | 1/2015 | |

OTHER PUBLICATIONS

Mark D Guynn et al., "Refined Exploration of Turbofan Design Options for an Advanced Single-Aisle Transport", (Jan. 1, 2011), NASA/TM-2011-216883, XP055114168, 36 pages total.
(Continued)

*Primary Examiner* — Topaz L. Elliott
(74) *Attorney, Agent, or Firm* — Sughrue Mion, PLLC

(57) ABSTRACT

A turbomachine comprising a ducted fan, a low-pressure turbine shaft and a reduction gearbox housed in a casing between the fan and the low-pressure turbine shaft, the fan rotor supplying airflow to a primary stream and a secondary stream and comprising a hub of diameter D1, wherein—the
(Continued)

diameter D3 of the fan rotor is greater than 82 inches (2.08 metres), —the pressure ratio of the fan is between 1.10 and 1.35, the turbomachine comprises a low-pressure compressor separate from the fan, the reduction gearbox being interposed between the fan rotor and a turbine shaft of the low-pressure compressor, and wherein the reduction gearbox casing has an outside diameter D2 greater than the diameter D1 of the hub, the pitch diameter D4 of the reduction gearbox ring being between 0.15 and 0.35 times the fan rotor diameter.

14 Claims, 5 Drawing Sheets

(51) Int. Cl.
  *F01D 7/00* (2006.01)
  *F01D 11/08* (2006.01)
(52) U.S. Cl.
  CPC ...... *F05D 2240/20* (2013.01); *F05D 2260/40* (2013.01)

(56) References Cited

U.S. PATENT DOCUMENTS

| | | | |
|---|---|---|---|
| 10,982,563 B1* | 4/2021 | Spruce | F01D 25/18 |
| 2003/0138317 A1* | 7/2003 | Barnett | F04D 29/4206 |
| | | | 415/57.4 |
| 2014/0255188 A1* | 9/2014 | Fulayter | F04D 29/323 |
| | | | 416/1 |
| 2014/0363276 A1* | 12/2014 | Vetters | F02K 3/04 |
| | | | 415/124.2 |
| 2016/0108807 A1* | 4/2016 | Schwarz | F01D 5/12 |
| | | | 60/805 |
| 2017/0362999 A1* | 12/2017 | Abe | F02C 7/36 |
| 2018/0252166 A1* | 9/2018 | Pointon | F16H 1/28 |

OTHER PUBLICATIONS

R.A. Zimbrick et al., "Investigation of Very High Bypass Ratio Engines for Subsonic Transports", Journal of Propulsion and Power, American Institute of Aeronautics and Astronautics, New York, US, vol. 6, No. 4, (Jul. 1, 1990), pp. 490-496, XP000136188, 7 pages total.

Search Report dated Jan. 11, 2018, from the French Patent Office in Application No. FR 1753856.

International Search Report dated Jul. 19, 2018, from the International Searching Authority in Application No. PCT/FR2018/000107.

\* cited by examiner

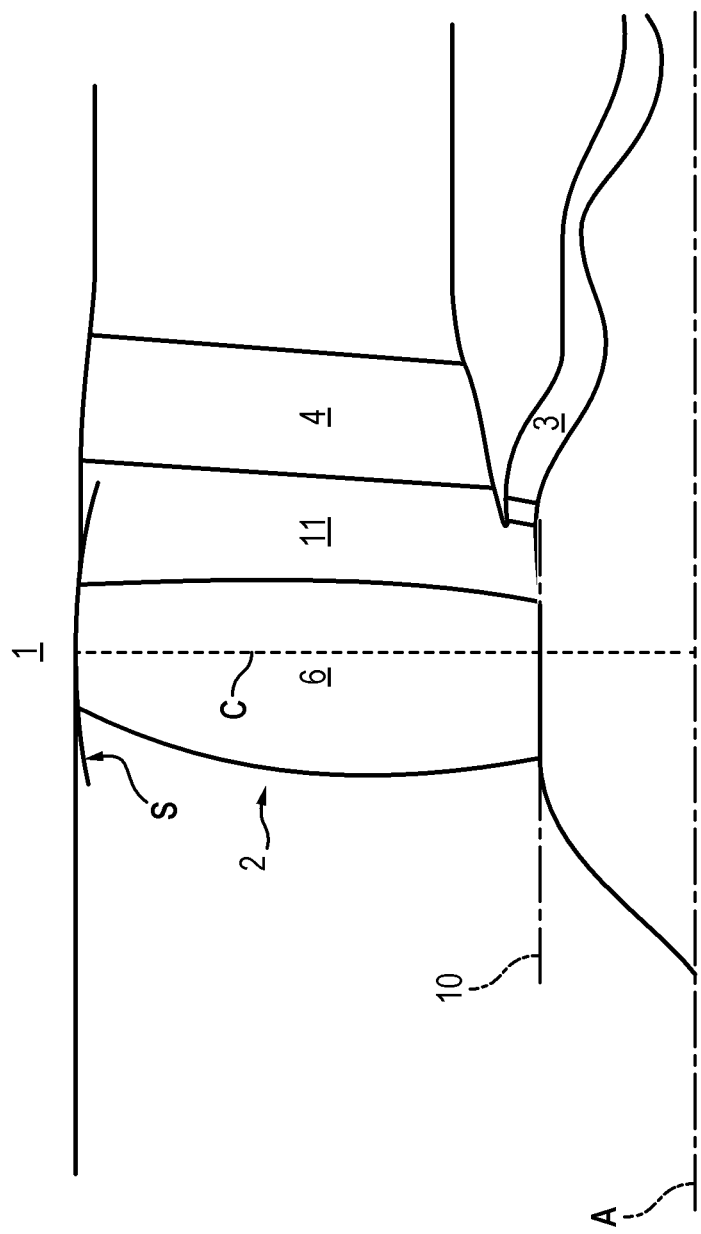

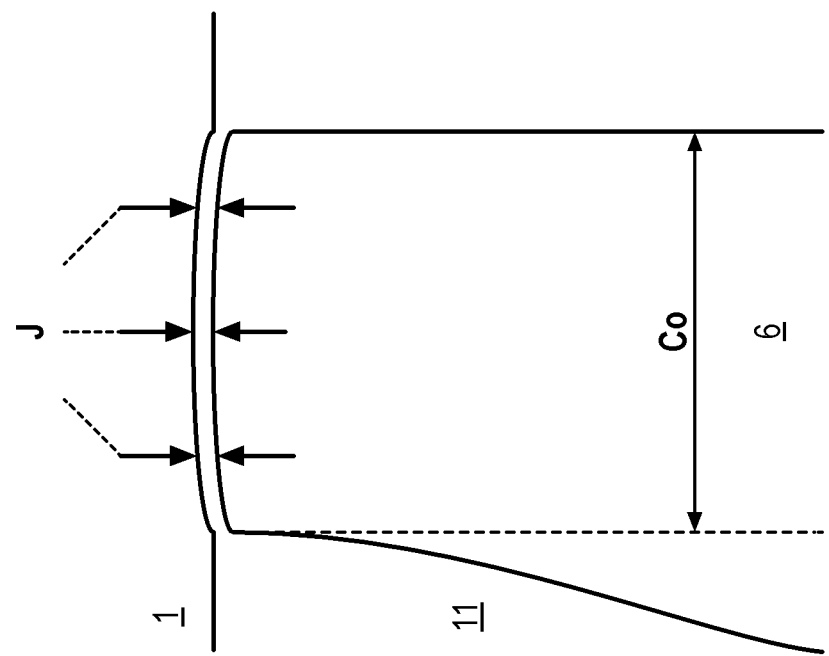

TURBOMACHINE WITH FAN ROTOR AND REDUCTION GEARBOX DRIVING A LOW-PRESSURE DECOMPRESSOR SHAFT

TECHNICAL FIELD AND PRIOR ART

The present invention pertains to the field of turbomachines.

Searching to minimise polluting emissions linked to air transport also involves improving the propulsion system efficiency, and more particularly the propulsion yield characterising the efficiency with which the energy that is communicated to the air that crosses the engine, is converted into useful thrust force.

The elements first affecting this propulsion efficiency are those linked to the low pressure portions of the propulsion system, these immediately contribute to generating thrust: low pressure turbine, low pressure transmission system, fan rotor and secondary channel guiding the flow of the latter.

The guiding principle which is known for improving propulsion efficiency consists in reducing the fan compression rate, thereby, reducing the engine output flow speed and the losses by kinetic energy linked thereto.

One of the main consequences of this reduction in engine output flow speed is that it is essential to submit a more important mass air flow rate to the low pressure portion (secondary flow) in order to ensure a given thrust level, set by the airplane characteristics: this hence leads to increasing the engine by-pass ratio.

The direct effect of this increase in secondary flow rate is the need to increase the diameter of the fan, and consequently the external dimensions of the retention casing surrounding it, as well as the nacelle constituting the aerodynamic envelope of the actual casing. Thus, the issue is raised with more and more acuteness about the capacity of integrating propulsion systems of gradually larger dimensions under an aircraft wing, within a context where the ground clearance is restricted.

Apart from the dimensional aspects, the increase in by-pass ratio puts the mass of the propulsion system at a disadvantage, via particularly a very significant increase of the mass of the fan casing, sized for the centrifugal retention in the event of blading ejection.

Thus, it has been noted that the highest by-pass ratios, although synonymous with better propulsion efficiency, are accompanied by such important shortcomings in terms of mass and drag and installation difficulties under the wing that the major part of the expected gain is hindered by these elements.

An alternative to this paradigm consists in getting rid of the notion of fairing of the low pressure portion: the thus, constituted propulsion architecture bears the name of turboprop engine (case of a unique non-faired low pressure rotor, qualified as a propeller), or of the currently used "open rotor" (case of two contra-rotating low pressure rotors, qualified as contra-rotating propellers). Although, this alternative architecture allows to be rid of constraints of mass and friction drag of the fairing of the secondary portion which is now inexistent, it still poses other issues: first, the absence of a fairing makes the certification context very different with respect to the potential ejection of the low pressure rotor blade and requires taking into account more complex technologies on the rotor (a "fail safe" blade according for example), second, the absence of a fairing around the low pressure portion makes the aerodynamic operating of its rotor very sensitive to the variations in flight conditions (especially speed), and reduces the aircraft's maximum allowable flight speed. Finally, the absence of a fairing induces a specific flow rate that is much lower than a solution with a fairing, leading, for a given thrust level, to much more important external dimensions than a solution with a fairing, thereby, aggravating the installation difficulty on the airframe structure on the dimensional plane.

The total suppression of the fairing of the low pressure portion, although, it is considered an acceptable option for average-size aircrafts which fly at low to medium speeds (regional/short haul flights), it seems to induce too many drawbacks for usage on higher thrust classes (medium and long haul), for which the flight speed capacity is hardly open to discussion as far as operators are concerned.

It is already known from document WO2014/143248 a turbomachine structure with a high by-pass ratio comprising a fan, a low pressure turbine shaft and a reduction gearbox housed in a casing between the fan and the low pressure turbine shaft.

The diameter of the fan rotor ranges between 80 and 110 inches, whereas the pressure ratio of the fan ranges between 1.15 and 1.24.

In this document, the turbomachine does not comprise a low pressure compressor, distinct from the fan.

It is further known from application WO2015/012923 a turbomachine comprising a fan, a low pressure compressor and a reduction gearbox housed in a casing between the fan and the low pressure compressor.

However, this document does not at all take into consideration fans with very low pressure ratios.

Furthermore, application WO2015/012923, similar to document WO2014/143248, provide a fairing that defines an air inlet and a secondary nozzle upstream and downstream of the fan.

GENERAL PRESENTATION OF THE INVENTION

A general purpose of the invention is to propose a solution allowing to overcome the drawbacks of the techniques of the prior art.

In particular, a purpose of the invention is to propose a solution allowing ensuring the efficiency of the low pressure turbine coupled with a slow fan rotor, having a very low pressure ratio.

Particularly, a purpose of the invention is to propose an architecture wherein a reduction gearbox is interposed within the fan hub between a fan rotor and a low pressure compressor turbine shaft:
  without overly affecting the internal radius of the fan,
  while being compatible with the operating of said turbomachine in all the critical conditions, for a slow fan rotor having a very low pressure ratio.

Another purpose of the invention is to propose a ducted fan rotor solution wherein mass and drag impacts of the fairing are limited.

In particular, a purpose of the invention is to propose an architecture allowing a fairing substantially ensuring an aerodynamic border function around the fan rotor, without a guiding role for the upstream flow of the fan (a role usually ensured by the air input) and/or without a role of pressure field control downstream of the fan rotor (a role usually ensured by a secondary nozzle).

Moreover, another purpose is to propose a solution with a fairing substantially ensuring an aerodynamic border function allowing making a "reverse" function, despite the absence of doors or thrust reversal grids downstream of the fan.

Another purpose of the invention is to propose a solution having restricted acoustic emission, whereas even the reduced fairing dimensions make it difficult to physically integrate standard absorbing acoustic treatments.

According to an aspect, the invention proposes a ducted fan, a low pressure turbine shaft and a reduction gearbox housed in a casing between the fan and the low pressure turbine shaft, the fan rotor supplying air flow to a primary stream and a secondary stream and including a hub of diameter D1, wherein, the diameter of the fan rotor is greater than 82 inches (2.08 meters), the pressure ratio of the fan ranges between 1.10 and 1.35, characterised in that it includes a low pressure compressor distinct from the fan, the reduction gearbox being interposed between the fan rotor and a low pressure compressor turbine shaft, and in that the casing of the reduction gearbox has an external diameter D2 greater than the diameter D1 of the hub, the pitch diameter of the reduction gearbox ring ranging between 0.15 and 0.35 times the diameter of the fan rotor.

Such a reduction gearbox allows ensuring the efficiency of the low pressure turbine.

Its dimensioning and positioning prevent unacceptable bulk.

It allows for a compatible integration with a hub ratio allowing Mach/flow rate pairs of the fan.

According to another aspect, the turbine includes a compact nacelle.

More particularly, the nacelle is a protective fairing surrounding the fan rotor, said fairing exhibiting a limited length with respect to said rotor.

In this manner, the nacelle is reduced to its most basic function, the fairing only imparting it with an aerodynamic border function around the fan rotor.

It does not extend nor upstream nor downstream of said rotor and consists in an aerodynamic fairing sized to ensure a protection against blade ejection.

The function of guiding the flow upstream of the fan rotor (a role specifically played by the air inlet) is suppressed.

Similarly for the functions of controlling the downstream pressure field (role previously played by the secondary nozzle) and making the reverse thrust function (a role previously played by a specific system integrated in the nacelle).

Furthermore, the blades advantageously have variable settings.

This allows piloting from the operating point of the fan according to the flight conditions. In fact, it is worth noting that the association of a fan with a very low pressure ratio and the absence of a secondary nozzle (whereof one of the key roles is to pilot with the position of the operating point of the fan in its field) induces a high variability of the fan operating lines between low altitude and high altitude conditions; potentially, this situation induces an operating difficulty (lack of leeway during surge) in ground conditions, and a piloting device from the operating point of the fan according to flight condition proves to be necessary.

Optionally, the variable setting can be configured to allow thrust reversal operation.

The thrust reversal is thus achieved by rotating the blades on their setting axis.

It is worth noting here that several issues can appear when a variable setting is provided for the fan blades.

Usually, in a turbomachine, the internal portion of the stream traces an arc of a circle passing by the summit of the cone on the axis of the turbomachine and ending at the end of the low pressure compressor passing by the fan.

The form of the stream at the blade root leads to the appearance of an important step when the setting is modified.

A classic cutout of a complementary blade tip of a cylindrical or tapered stream causes, between the blade tip and the fairing, very important clearances, that are essential to allow a contactless setting variation, but cause a significant loss of efficiency.

These efficiency losses, such as the resulting acoustic noise, are particularly unacceptable in the case of a turbomachine having a slow fan rotor with a very low pressure ratio.

Thus, according to yet another aspect, the invention proposes a turbomachine wherein the stream defined between the fairing and the hub is substantially cylindrical at the blade root, the angle of glide of the hub at the blade root being null or lower than 5°.

In addition, the fairing exhibits a spherical annular reinforcement at the blade tip, the blade tips being of a general complementary form (the cutout of the blade tip tracing a sphere that is slightly smaller than the casing sphere).

The mean clearance (mean clearance value along the blade tip) between the spherical annular reinforcement wall and a blade tip made dimensionless by the chord at the tip of the blading is lower than 0.35% when the turbomachine is at its maximum regime on the ground. It is lower than 0.65% in cruise regime of the turbomachine.

By mean clearance, it here means the mean clearance value along the blade tip.

It is worth noting that the chord equals the length of the profile, that is to say, the smallest distance between the leading edge and the trailing edge. For the chord at the tip, it is the distance between the end at the tip of the leading edge and the end at the tip of the trailing edge.

Also, the cruise regime is defined is defined as ranging between 85% and 100% of the turbomachine nominal regime. The cruise phase begins at the top of the climb of the aircraft, and ends at the start of the descent phase of the aircraft.

PRESENTATION OF THE FIGURES

Other characteristics and advantages of the invention will become more apparent from the following description, which is purely illustrating and non limiting, and should be read in light of the accompanying figures on which:

FIG. 2 illustrates a configuration example with a spherical blade tip;

FIGS. 3a and 3b illustrate the definition of a chord at the blade root, as well as the clearances between a blade root and the fairing wall;

DESCRIPTION OF ONE OR SEVERAL IMPLEMENTATION MODES AND EMBODIMENTS

Figure 1:
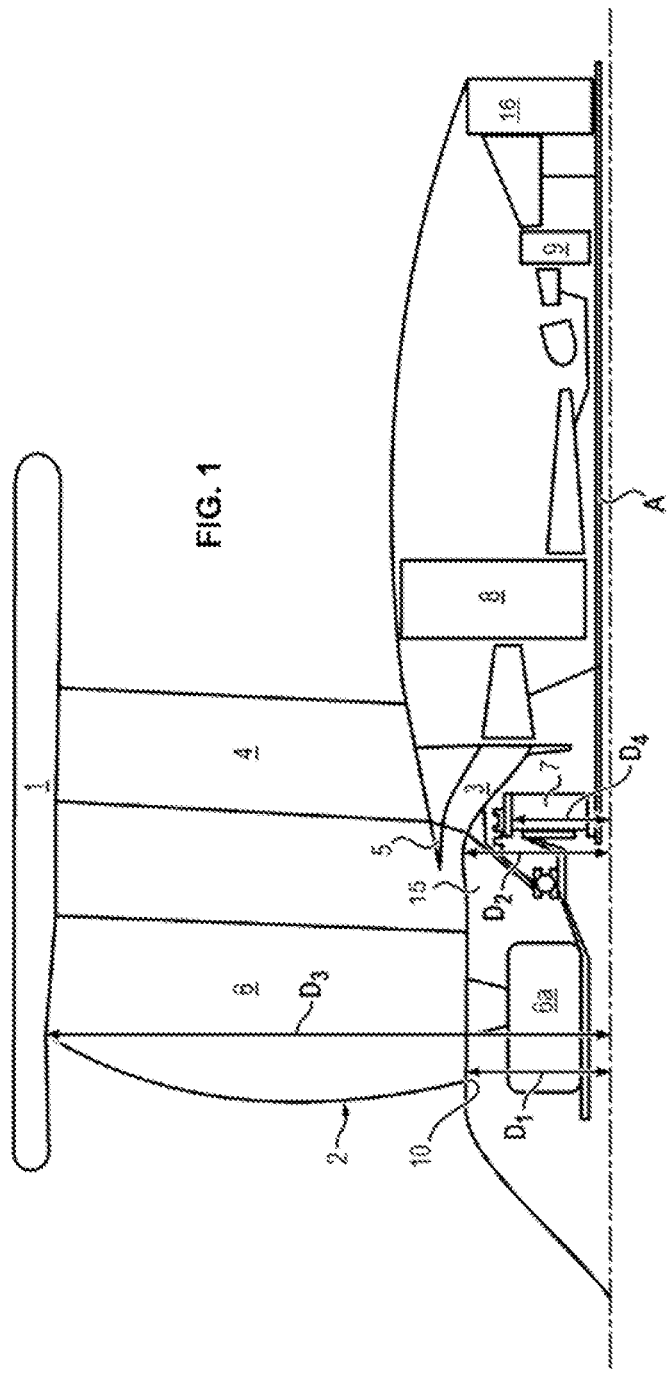
FIG. 1 is a schematic representation in a sectional view (half-view) illustrating the integration of a fan reduction gearbox in a turbomachine in accordance with a possible embodiment of the invention.

The turbomachine T illustrated on FIG. 1 exhibits an architecture with a ducted fan having an ultra high by-pass ratio, called UHBR.

It includes a nacelle 1, a fan rotor 2, as well as a primary stream 3, defined in a casing 5.

It is also represented on FIG. 1 an inter-compressor casing 8 of the turbomachine, an inter-turbine casing 9, as well as an exhaust casing 16.

The nacelle 1 is compact and particularly of reduced length. In particular, it does not integrate air inlets or secondary nozzles upstream or downstream of the fan.

Neither does it integrate a thrust reversal mechanism.

Its main functions are to ensure the turbomachine aerodynamic fairing and the retention of the fan vanes/blades and is dimensioned solely for this purpose.

A rectifier assembly 4 is interposed between the nacelle 1 and the casing 5 and allows to hold said nacelle 1.

In a possible embodiment, a portion of the nacelle 1 can be made jointly with an already existing surface on the aircraft, such as for example the underwing.

The blades of the fan rotor 2 are blades 6 with variable settings (mechanism 6a).

The blade 6 setting can in particular be controlled to drive the fan while in operation. The very low pressure ratio of the latter in fact induces variations in the cycle parameters between ground and flight conditions of unusual amplitude, particularly as regards turbine operating temperatures HP and nozzle expansion ratios.

Controlling the blade setting allows to adapt to these operating condition deviations.

In addition, it is used to ensure braking action of the aircraft or to contribute to it.

The diameter D3 of the fan rotor 2 is important: greater than 82 inches (2.08 metres), and preferably between 90 (2.29 metres) and 150 inches (3.81 metres).

The fan pressure ratio (FPR) is low: ranging between 1.10 and 1.35.

With this dimensioning taken into account, the rotational speed of the rotor 2 is low.

A reduction gearbox 7 is therefore provided for driving the shaft A of the low pressure turbine.

This reduction gearbox 7 allows for a high low pressure turbine regime: between 3.5 and 8 times the regime of the rotor 2 and preferably between 5 and 6 times the speed regime of the latter. The reduction ratio and the torque to be transmitted define the encumbrance of the reduction gearbox. Here, the reduction gearbox 7 is of epicyclic type and hence, its reduction ratio is defined by: 1+ (the number of teeth of the ring/the number of teeth of the central sun gear). The torque to be transmitted defines the minimum size of the teeth and the minimum diameter of the central sun gear. However, here the power of the reduction gearbox should be between 10 and 40 MW. The pitch diameter of the ring D4 is hence complex to integrate for such a reduction ratio and ranges between 0.15 and 0.35 times the fan diameter.

The diameter D3 of the fan is determined in a standard manner, by projection of the radial component at the fan blade 6 tip, onto a radial straight line passing by the leading edge of the blade, at its root.

The hub ratio is defined as the ratio of the internal radius at the fan blade 6 root, measured at the leading edge of the blading (at its design setting, in the case where the blading has a variable setting), and the external radius of the leading edge of the blade 6 projected onto the same straight line. In order to ensure a good efficiency of the turbomachine, the hub ratio is restricted to the maximum, thereby the hub diameter ranges between 0.25 and 0.35 the diameter of the fan.

In particular, the radius at the base of the fan can range between 300 and 600 mm.

To integrate a reduction gearbox with a high reduction rate while maintaining the smallest possible hub ratio without affecting the aerodynamic characteristics of the primary stream the casing surrounding the reduction gearbox (casing 15) includes a limited outgrowth. Particularly, the ratio between the external diameter (diameter D2 of the casing 15 of the reduction gearbox) and the diameter D1 of the fan hub 10 is greater than 1 (D2>D1) and ranges between 1 and 1.10, and preferably lower than 1.04.

Such a ratio simultaneously allows for the required aerodynamic form for the primary stream 3 and the integration of operations of the reduction gearbox (oil discharge for example) and of the fan (pitch change system), while maintaining a hub ratio that is as low as possible. The inlet casing wherein the reduction gearbox is integrated is particularly cumbersome as it has to hold the reduction gearbox, absorb the axial thrust generated by the fan by means of the ball bearing and hold the low pressure shaft.

Furthermore, the inlet power of the reduction gearbox ranges between 10 and 40 MW at takeoff (@ T/O)-altitude 0, Mach ranging between 0.15 and 0.28)).

The thus, constituted propulsion system meets the following objectives:
- maximisation of the propulsion efficiency thanks to the fan having a very low pressure ratio;
- competitiveness in terms of fuel consumption for classes of thrust and flight speeds for medium-haul and longer haul applications (thrust >15000 lbf in take-off condition 0 m/zero airspeed/IAS conditions; 0.65<cruise Mach<0.9.

The fairing (nacelle 1) allows for minimum drag and is not disadvantageous in mass.

The configuration of blade with variable setting 6 illustrated on FIG. 2 is particularly interesting, in particular to achieve the thrust reversal function.

In this configuration, the stream 11 between the fairing 1 and the hub 10 is substantially cylindrical at the root of the blade, that is to say, at the hub 10, such as to limit generating steps in the stream while avoiding complex blade forms.

More particularly, the slope of the hub 10 at the blade root (discontinuous line on FIG. 2) makes a null angle or lower than 5° with respect to the axis of the shaft A of the turbomachine.

In addition, the blades 6 exhibit at their tip a general spherical or substantially spherical form (slight differences in radius at the blade tips may be present between the leading edge and the trailing edge). This general spherical form is itself received in a spherical annular reinforcement formed on the fairing wall 1, thereby, contributing to defining the stream 11.

FIG. 2 represents an arc of a sphere S corresponding to this general spherical form at the blade tip, and a spherical reinforcement on the fairing wall. This arc of a sphere S is centered on the intersection between the axis of the shaft A of the turbomachine and the setting axis of a blade (axis C on FIG. 2). The radius of this arc of a sphere S corresponds to the largest radius of the fan rotor at the blade tip.

The spherical cutout at the blade tip prevents contact at the blade tip whatever the blade 6 setting orientation. In fact, the blade tip turns perfectly in the spherical annular reinforcement that receives it on the fairing 1 wall, without any blocking or creating of a significant clearance.

This way, efficiency losses are minimised.

The clearance J between a blade tip and the fairing 1 wall has been illustrated on FIG. 3a.

This clearance provided between the blades 6 and the fairing 1 should enable to absorb variations as per the dimensions of the blades in operation.

The mean clearance is lower than 0.35% of the chord at the tip (double arrow Co on FIGS. 3a and 3b) when the engine nears its maximum ground regime (Red Line sol). It can reach 0.65% of this chord during flight in cruise regime.

Figure 3B:
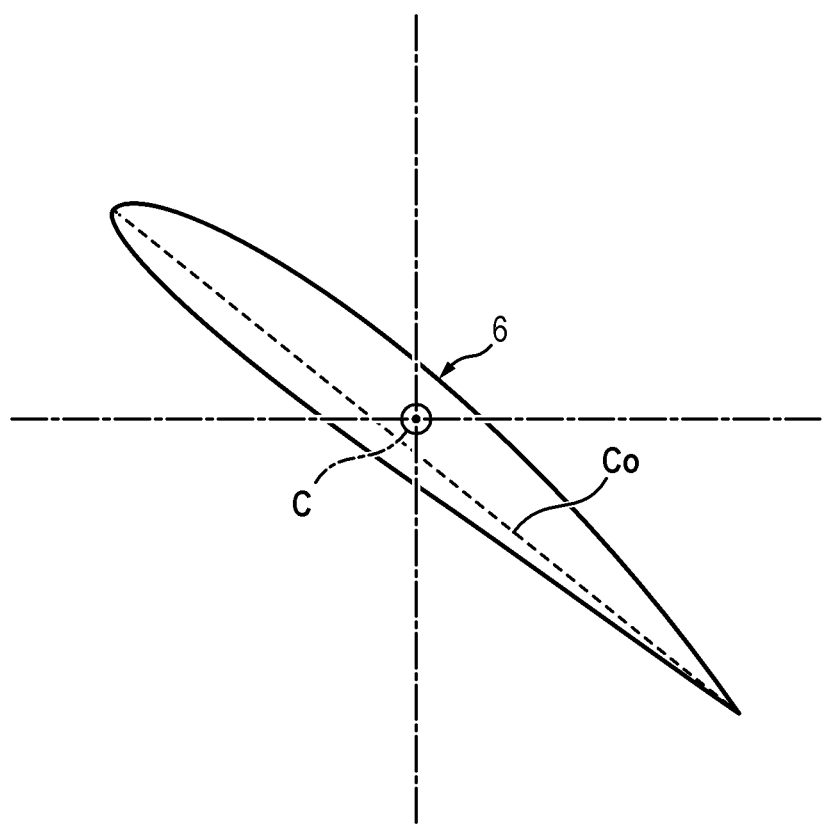

It is noteworthy, that the chord corresponds to the length of the profile, that is to say, the shortest distance between the leading edge and the trailing edge (FIG. 3b). For the chord at the tip, it is the distance Co between the end at the tip of the leading edge and the end at the tip of the trailing edge (FIG. 3a).

Furthermore, the mean clearance should also allow for the disassembly of the blades 6 and their exit with respect to the engine, for example once the holding wedge at the blade root is removed.

In fact, it is known, that for maintaining the fan blades, it is usually provided for the latter, at their internal end, a root engaged axially in the cells of the fan disk and radially retained by the disk teeth. A wedge is interposed between each blade root and the bottom of the corresponding cell. Examples of assembly/disassembly of blades on a fan disk is for example described in application FR3034130.

Figure 4:
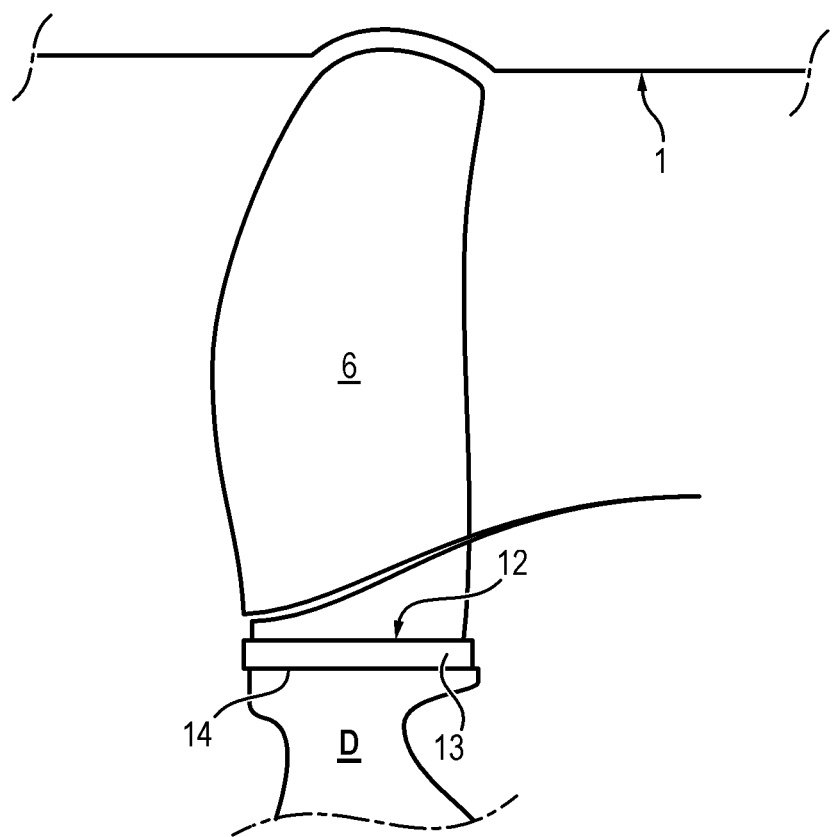
FIG. 4 illustrates a structure for holding the blade in a cell by means of a holding wedge.

An example of wedge is illustrated on FIG. 4 on which is represented a blade 6, whereof the root 12 is axially engaged in a cell 13 of the rotor disk D. A wedge 14 is arranged between the bottom of the cell 13 and the blade root 12.

The radially external faces of the wedges 14 of the blades espouse the blade roots 12 whereas the radially internal faces of said wedges 14 espouse the bottoms of the cells 13. These wedges 14 are relatively flat and extend over the entire length of the bottoms of the cells. A wedge is thus interposed between each blade root and the corresponding cell bottom, for the purpose of maintaining and preventing premature wear.

As for the clearance J (FIG. 3a), it is provided for the assembly/disassembly of a blade 6.

To this end, it should be ensured that the height difference between the radius at the leading edge at the blade tip and the maximum radius at the blade tip at the setting axis C) be lower than the sum of the clearance space at the blade tip (clearance between, on the one hand the blade tip and the fairing wall 1 which contributes in defining the stream 11) and on the other hand, the height of the wedge under the blade root.

Also, the setting axis C may not be exactly perpendicular to the axis of the shaft A, but may be slightly slanted upstream or downstream.

The invention claimed is:

1. A turbomachine comprising:
a ducted fan including a fan rotor;
a low pressure turbine shaft; and
a reduction gearbox comprising a ring gear and housed in a casing between the ducted fan and the low pressure turbine shaft,
wherein the fan rotor is configured to supply air flow to a primary stream and a secondary stream and includes a hub of a diameter and blades each extending from a blade root at the hub to a blade tip, the blades of the fan rotor being of variable setting type, and an external surface of the hub being continuous with a leading surface of the blades at the blade roots,
a diameter of the fan rotor is greater than 82 inches (2.08 meters),
a pressure ratio of the ducted fan is between 1.10 and 1.35,
the diameter of the hub is between 11.811 inches (300 millimeters) and 23.622 inches (600 millimeters),
the turbomachine further comprises a low pressure compressor distinct from the ducted fan,
the reduction gearbox is interposed between the fan rotor and the low pressure turbine shaft,
the casing of the reduction gearbox has an external diameter greater than the diameter of the hub, and a pitch diameter of the ring gear of the reduction gearbox is between 0.15 and 0.35 times the diameter of the fan rotor, and
the turbomachine further comprises a nacelle which is a protective fairing surrounding the fan rotor, wherein a main stream defined between the protective fairing and the hub is substantially cylindrical at the blade roots, a slope of the hub at the blade roots being null or lower than 5°.

2. The turbomachine according to claim 1, wherein the diameter of the fan rotor is between 90 inches (2.29 metres) and 150 inches (3.81 metres).

3. The turbomachine according to claim 1, wherein the reduction gearbox is of epicyclic type.

4. The turbomachine according to claim 1, wherein the diameter of the hub of the ducted fan is between 0.25 and 0.35 of a diameter of the ducted fan.

5. The turbomachine according to claim 1, wherein a reduction rate of the reduction gearbox is between 3.5 and 8.

6. The turbomachine according to claim 1, wherein a reduction rate of the reduction gearbox is between 5 and 6.

7. The turbomachine according to claim 1, wherein a ratio of the external diameter of the casing of the reduction gearbox and the diameter of the hub of the ducted fan is between 1 and 1.10.

8. The turbomachine according to claim 1, wherein the protective fairing comprises a spherical annular reinforcement wall opposing the blade tips across a clearance, the blade tips being of a general complementary form.

9. The turbomachine according to claim 8, wherein a mean clearance between the spherical annular reinforcement wall and the blade tips is less than 0.35% of a chord length of the blades when the turbomachine is at its maximum ground regime.

10. The turbomachine according to claim 8, wherein a mean clearance between the spherical annular reinforcement wall and the blade tips is less than 0.65% of a chord length of the blades in a cruise regime of the turbomachine.

11. An aircraft including a turbomachine according to claim 1.

12. A turbomachine comprising:
a ducted fan including a fan rotor;
a low pressure turbine shaft; and
a reduction gearbox comprising a ring gear and housed in a casing between the ducted fan and the low pressure turbine shaft,
wherein the fan rotor is configured to supply air flow to a primary stream and a secondary stream and includes a hub of a diameter and blades each extending from a blade root at the hub to a blade tip, the blades of the fan rotor being of variable setting type, and an external surface of the hub being continuous with a leading surface of the blades at the blade roots,
a diameter of the fan rotor is greater than 82 inches (2.08 meters),
a pressure ratio of the ducted fan is between 1.10 and 1.35,
the diameter of the hub of the ducted fan is between 0.25 and 0.35 of a diameter of the ducted fan, the turbomachine further comprises a low pressure compressor distinct from the ducted fan, the reduction gearbox is interposed between the fan rotor and the low pressure turbine shaft, the casing of the reduction gearbox has an external diameter greater than the diameter of the hub, and a pitch diameter of the ring gear of the reduction gearbox is between 0.15 and 0.35 times the diameter of the fan rotor, and the turbomachine further comprises a nacelle which is a protective fairing surrounding the fan rotor, wherein a main stream defined between the protective fairing and the hub is substantially cylindrical at the blade roots, a slope of the hub at the blade roots being null or lower than 5°.

13. A turbomachine comprising:

a ducted fan including a fan rotor;

a low pressure turbine shaft; and a reduction gearbox comprising a ring gear and housed in a casing between the ducted fan and the low pressure turbine shaft, wherein the fan rotor is configured to supply air flow to a primary stream and a secondary stream and includes a hub of a diameter and blades each extending from a blade root at the hub to a blade tip, the blades of the fan rotor being of variable setting type, and an external surface of the hub being continuous with a leading surface of the blades at the blade roots, a diameter of the fan rotor is greater than 82 inches (2.08 meters), a pressure ratio of the ducted fan is between 1.10 and 1.35, a ratio of the external diameter of the casing of the reduction gearbox and the diameter of the hub of the ducted fan is between 1 and 1.10, the turbomachine further comprises a low pressure compressor distinct from the ducted fan, the reduction gearbox is interposed between the fan rotor and the low pressure turbine shaft, the casing of the reduction gearbox has an external diameter greater than the diameter of the hub, and a pitch diameter of the ring gear of the reduction gearbox is between 0.15 and 0.35 times the diameter of the fan rotor, and the turbomachine further comprises a nacelle which is a protective fairing surrounding the fan rotor, wherein a main stream defined between the protective fairing and the hub is substantially cylindrical at the blade roots, a slope of the hub at the blade roots being null or lower than 5°.

14. The turbomachine according to claim 1, wherein the protective fairing comprises a spherical annular reinforcement wall opposing the blade tips across a clearance, the blade tips being of a general complementary form, wherein a mean clearance between the spherical annular reinforcement wall and the blade tips is less than 0.35% of a chord length of the blades when the turbomachine is at its maximum ground regime, wherein a mean clearance between the spherical annular reinforcement wall and the blade tips is less than 0.65% of a chord length of the blades in a cruise regime of the turbomachine.

* * * * *